United States Patent
Chiu et al.

(10) Patent No.: US 10,810,457 B2
(45) Date of Patent: Oct. 20, 2020

(54) SYSTEM FOR SEARCHING DOCUMENTS AND PEOPLE BASED ON DETECTING DOCUMENTS AND PEOPLE AROUND A TABLE

(71) Applicant: FUJI XEROX CO., LTD., Minato-ku, Tokyo (JP)

(72) Inventors: Patrick Chiu, Mountain View, CA (US); Chelhwon Kim, Palo Alto, CA (US); Hajime Ueno, Cupertino, CA (US); Yulius Tjahjadi, San Mateo, CA (US); Anthony Dunnigan, Palo Alto, CA (US); Francine Chen, Menlo Park, CA (US); Jian Zhao, Cupertino, CA (US); Bee-Yian Liew, Cupertino, CA (US); Scott Carter, Menlo Park, CA (US)

(73) Assignee: FUJI XEROX CO., LTD., Tokyo (JP)

( * ) Notice: Subject to any disclaimer, the term of this patent is extended or adjusted under 35 U.S.C. 154(b) by 252 days.

(21) Appl. No.: 15/975,682

(22) Filed: May 9, 2018

(65) Prior Publication Data
US 2019/0347509 A1    Nov. 14, 2019

(51) Int. Cl.
*G06F 16/93* (2019.01)
*G06F 16/332* (2019.01)
(Continued)

(52) U.S. Cl.
CPC ............. *G06K 9/623* (2013.01); *G02B 13/06* (2013.01); *G06F 16/332* (2019.01); *G06F 16/93* (2019.01);
(Continued)

(58) Field of Classification Search
CPC ........ G06F 16/434; G06F 16/93; G06F 16/48; G06F 16/7867; G06F 16/24578;
(Continued)

(56) References Cited

U.S. PATENT DOCUMENTS

| | | | |
|---|---|---|---|
| 2010/0312734 A1* | 12/2010 | Widrow | G06N 3/02 706/25 |
| 2011/0096135 A1* | 4/2011 | Hegde | H04N 5/23219 348/14.07 |

(Continued)

OTHER PUBLICATIONS

Blei, D., et al., "Latent Dirichlet Allocation". J. Machine Learning Research, 3, (Jan. 2003), pp. 993-1022, 30 pages.
(Continued)

*Primary Examiner* — Dangelino N Gortayo
(74) *Attorney, Agent, or Firm* — Procopio, Cory, Hargreaves & Savitch LLP

(57) ABSTRACT

Systems and methods directed to utilizing a first camera system to capture first images of one or more people in proximity to a tabletop; utilizing a second camera system to capture second images of one or more documents in proximity to the tabletop; generating a query for a database derived from people recognition conducted on the first images and text extraction on the second images; determining a first ranked list of people and a second ranked list of documents based on results of the query, the results based on a calculated ranked list of two-mode networks; and providing an interface on a display to access information about one or more people from the first ranked list of people and one or more documents from the second ranked list of documents.

14 Claims, 8 Drawing Sheets

(51) Int. Cl.
*G06F 16/48* (2019.01)
*G06F 16/78* (2019.01)
*G06F 16/783* (2019.01)
*G06F 16/432* (2019.01)
*G06F 16/438* (2019.01)
*G06K 9/62* (2006.01)
*G02B 13/06* (2006.01)
*G06K 9/00* (2006.01)

(52) U.S. Cl.
CPC ..... *G06K 9/00288* (2013.01); *G06K 9/00456* (2013.01); *G06F 16/434* (2019.01); *G06F 16/4393* (2019.01); *G06F 16/48* (2019.01); *G06F 16/7837* (2019.01); *G06F 16/7867* (2019.01)

(58) Field of Classification Search
CPC .. G06F 16/332; G06F 16/4393; G06F 16/532; G06F 16/5854; G06F 16/70
USPC .................................. 707/728, 722, 748, 769
See application file for complete search history.

(56) References Cited

U.S. PATENT DOCUMENTS

| | | | | |
|---|---|---|---|---|
| 2011/0191336 | A1* | 8/2011 | Wang | G06F 16/00 707/728 |
| 2014/0172881 | A1* | 6/2014 | Petrou | G06F 16/9535 707/748 |
| 2014/0280296 | A1* | 9/2014 | Johnston | G06F 9/453 707/769 |
| 2016/0055380 | A1* | 2/2016 | Schmitz | G06K 9/00973 386/241 |
| 2017/0308550 | A1 | 10/2017 | Chiu et al. | |
| 2017/0351909 | A1* | 12/2017 | Kaehler | G06K 9/6257 |
| 2018/0005037 | A1* | 1/2018 | Smith, IV | G06K 9/6256 |
| 2018/0350144 | A1* | 12/2018 | Rathod | H04W 4/029 |

OTHER PUBLICATIONS

Chang, J., et al., "Reading Tea Leaves: How Humans Interpret Topic Models" NIPS 2009, pp. 288-296, 9 pages.
Chen, F., et al., "Topic Modeling of Documents Metadata for Visualizing Collaborations Over Time" Mar. 7-10, 2016; Sonoma, CA, USA,10 pages.
Chiu, P., et al., Picture Detection in Document Page Images, pp. 211-214, Sep. 21-24, 2010, Manchester, United Kingdom.
Dhillon, I., "Co-Clustering Documents and Words Using Bipartite Spectral Graph Partitioning", ( 2001), San Francisco, CA, USA, 6 pages.
Dunnigan, T., et al., " Evolution of a Tabletop Telepresence System Through Art and Technology", Oct. 26-30, 2015; Brisbane, Australia, 2 pages.
Kim, C., et al., High-Quality Capture of Documents on a Cluttered Tabletop with a 4K Video Camera, Sep. 8-11, 2015, Lausanne, Switzerland, 4 pages.
Liao, C., et al., "FACT: Fine-Grained Cross-Media Interaction with Documents via a Portable Hybrid Paper-Laptop Interface", Oct. 25-29, 2010, Firenze, Italy, 10 pages.
Newman, W., et al., CamWorks: A Video-Based Toolf for Efficient Capture From Paper Source Documents; (1999). pages.
Schilit, B. et al., "Beyond Paper: Supporting Active Reading with Free Form Digital Ink Annotations", Apr. 18-23, 1998, Los Angeles, CA, USA, pp. 249-256, 8 pages.
Schroff, F., et al., "FaceNet: A Unified Embedding for Face Recognition and Clustering", CVPR 2015, Computer Vision Foundation, pp. 815-823, 9 pages.
Uno, T., et al., "An Efficient Algorithm for Enumerating Closed Patterns in Transaction Databases", Discovery Science 2004, pp. 16-31, 16 pages.
Wellner, P., "The DigitalDesk Calculator: Tangible Manipulation on a Desk Top Display", Nov. 11-13, 1991, pp. 27-33, 7 pages.
Zhao J. et al., "BiDots: Visual Exploration of Weighted Biclusters", IEEE Vast 2017 (and IEEE TVCG, 24 (1): 2018), pp. 195-204; 10 pages.
Zhang,K., et al. "Joint Face Detection and Alignment using Multitask Cascaded Convolutional Networks", IEEE Signal Learning Processing Letters (2016), 5 pages.

\* cited by examiner

SYSTEM FOR SEARCHING DOCUMENTS AND PEOPLE BASED ON DETECTING DOCUMENTS AND PEOPLE AROUND A TABLE

BACKGROUND

Field

The present disclosure relates generally to document management systems, and more specifically, to document and person recognition and retrieval in a meeting or office setting.

Related Art

In related art implementations, while there are search systems to search relevant persons based on searching relevant documents, such implementations do not take into account the context of a meeting or office setting that may be concurrently happening.

In related art implementations, there are deep learning face detection and recognition algorithms, which improve on previous algorithms where it can be difficult to detect and recognize faces that are not facing the camera with two eyes visible. Using such related art implementations, it can be possible to detect and recognize faces at different poses and with distortion from a fisheye lens that covers a 180° view or a panoramic camera that covers a 360° view.

SUMMARY

In related art implementations, while there are systems wherein relevant persons within an organization can be retrieved from a database (e.g., based on the authors of the relevant document), there are no systems that utilize the information regarding the participants in a meeting or office setting that may be conferencing around a table or a desk. Such information may be needed in various meeting situations to easily access and print or retrieve relevant documents for a presentation based on the meeting participants.

For example, if insufficient physical copies of a document are made for a meeting or tabletop discussion, it is typically cumbersome for members of the meeting to retrieve the document to make another physical printout as such members would have to access a computer and the document management system to print out the document. Or, if certain members of a meeting request a soft copy of a document, the author of the document would typically have to return to their desk to access a computer to forward such a document via e-mail or other methods. Further, if there are certain topics during the meeting discussion that other members of the meeting have relevant published papers, such members may wish to access their relevant documents, but may not have access to a computer or other device to retrieve and provide such documents to the meeting members.

Example implementations described herein address the above problem by recognizing the people around the table captured by a fisheye lens, and utilize such information for formulating the query, and for processing the retrieved results to generate an interactive visualization of the relevant persons and documents.

Aspects of the present disclosure include a system, which involves a processor, configured to utilize a first camera system to capture first images of one or more people in proximity to a tabletop; utilize a second camera system to capture second images of one or more documents in proximity to the tabletop; generate a query for a database derived from people recognition conducted on the first images and text extraction on the second images; determine a first ranked list of people and a second ranked list of documents based on results of the query, the results based on a calculated ranked list of two-mode networks; and provide an interface on a display to access one or more documents from the second ranked list of documents.

Aspects of the present disclosure further include a method, which involves utilizing a first camera system to capture first images of one or more people in proximity to a tabletop; utilizing a second camera system to capture second images of one or more documents in proximity to the tabletop; generating a query for a database derived from people recognition conducted on the first images and text extraction on the second images; determining a first ranked list of people and a second ranked list of documents based on results of the query, the results based on a calculated ranked list of two-mode networks; and providing an interface on a display to access one or more documents from the second ranked list of documents.

Aspects of the present disclosure further include a non-transitory computer readable medium, storing instructions for executing a process, the process involving utilizing a first camera system to capture first images of one or more people in proximity to a tabletop; utilizing a second camera system to capture second images of one or more documents in proximity to the tabletop; generating a query for a database derived from people recognition conducted on the first images and text extraction on the second images; determining a first ranked list of people and a second ranked list of documents based on results of the query, the results based on a calculated ranked list of two-mode networks; and providing an interface on a display to access one or more documents from the second ranked list of documents.

Through the example implementations described herein, relevant documents can be retrieved for participants around a tabletop discussion for execution on a presentation application for a display, for print out if additional print outs of copies are needed, or for providing soft copies to other user devices without having to find access to a computer terminal to access such documents. Further, documents relating to the topic at hand can also be provided to the members of the tabletop discussion through utilizing people recognition and two-mode networks for retrieving documents authored by members of the tabletop discussion that are relevant to the discussion at hand.

DETAILED DESCRIPTION

Figure 1:
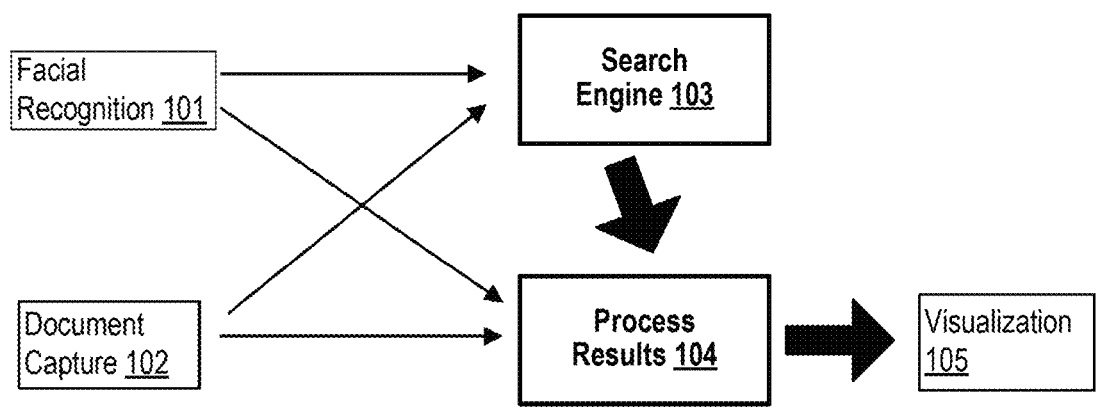
FIG. 1 illustrates an example overview of the system, in accordance with an example implementation.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application.

FIG. 1 illustrates an example overview of the system, in accordance with an example implementation. In example implementations of the system, people recognition 101 and document capture 102 are conducted in tandem for a meeting or office setting, which is processed by a search engine 103 and process results 104 to produce a visualization 105. Example implementations described herein are directed to a system that searches for relevant documents and people in the context of a meeting or office setting, such as (but not limited thereto) a small group meeting around a table, or a person sitting at a smart desk. The search query is formulated based on text from the documents on the table, in conjunction with the names of the participants. The document text is obtained using a high-resolution camera and optical character recognition (OCR). The names of the participants are obtained using a fisheye lens and face recognition algorithms based on deep learning. The search results are processed to generate different ranked lists of the relevant documents and participants (e.g. focusing on or filtering out the recognized participants and their documents). Ranked lists of two-mode networks are computed based on topic analysis for visualization using the interactive application.

Figure 2A:
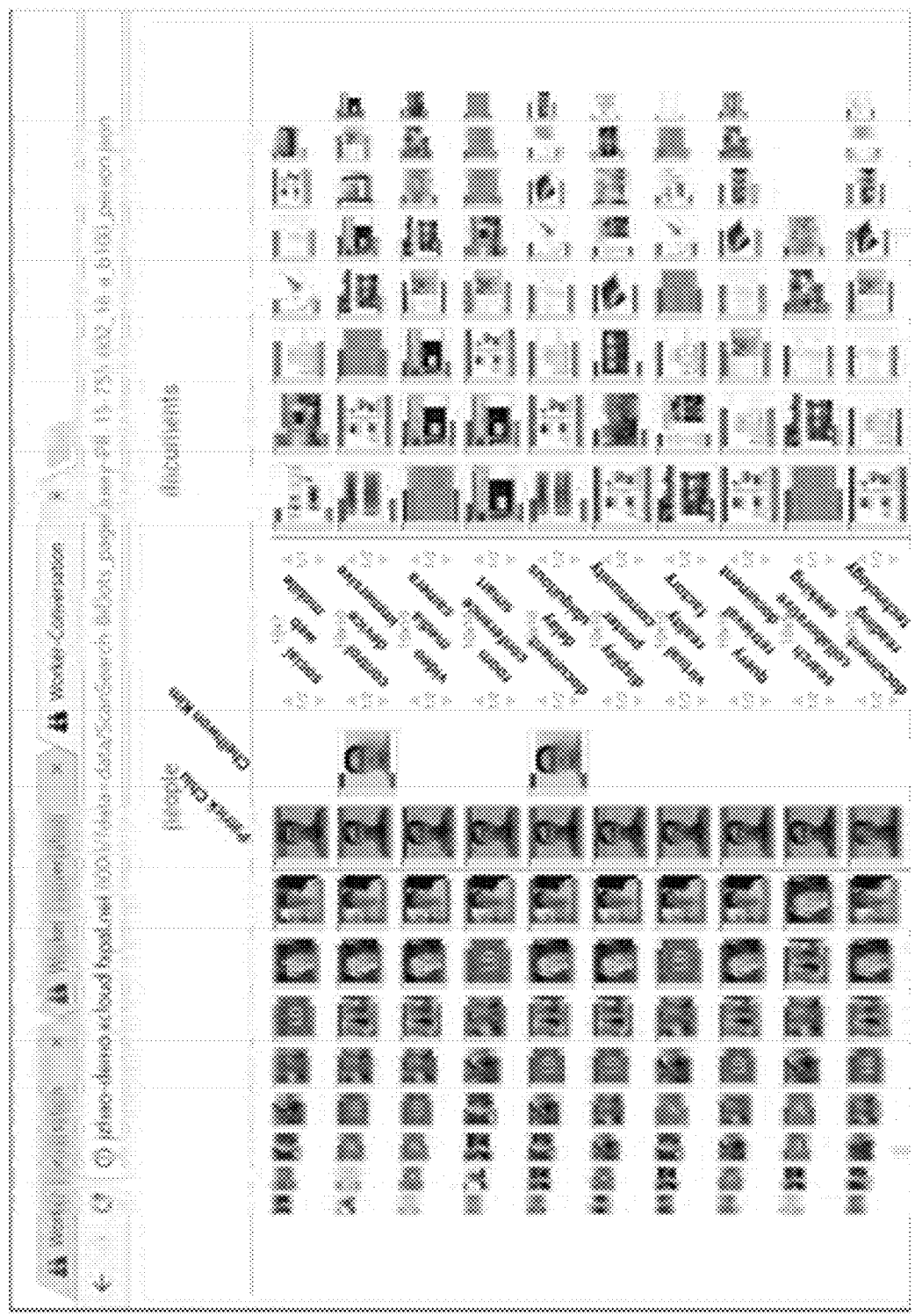
FIGS. 2(a) to 2(d) illustrate an interactive visualization of the search results, in accordance with an example implementation.
Figure 2B:
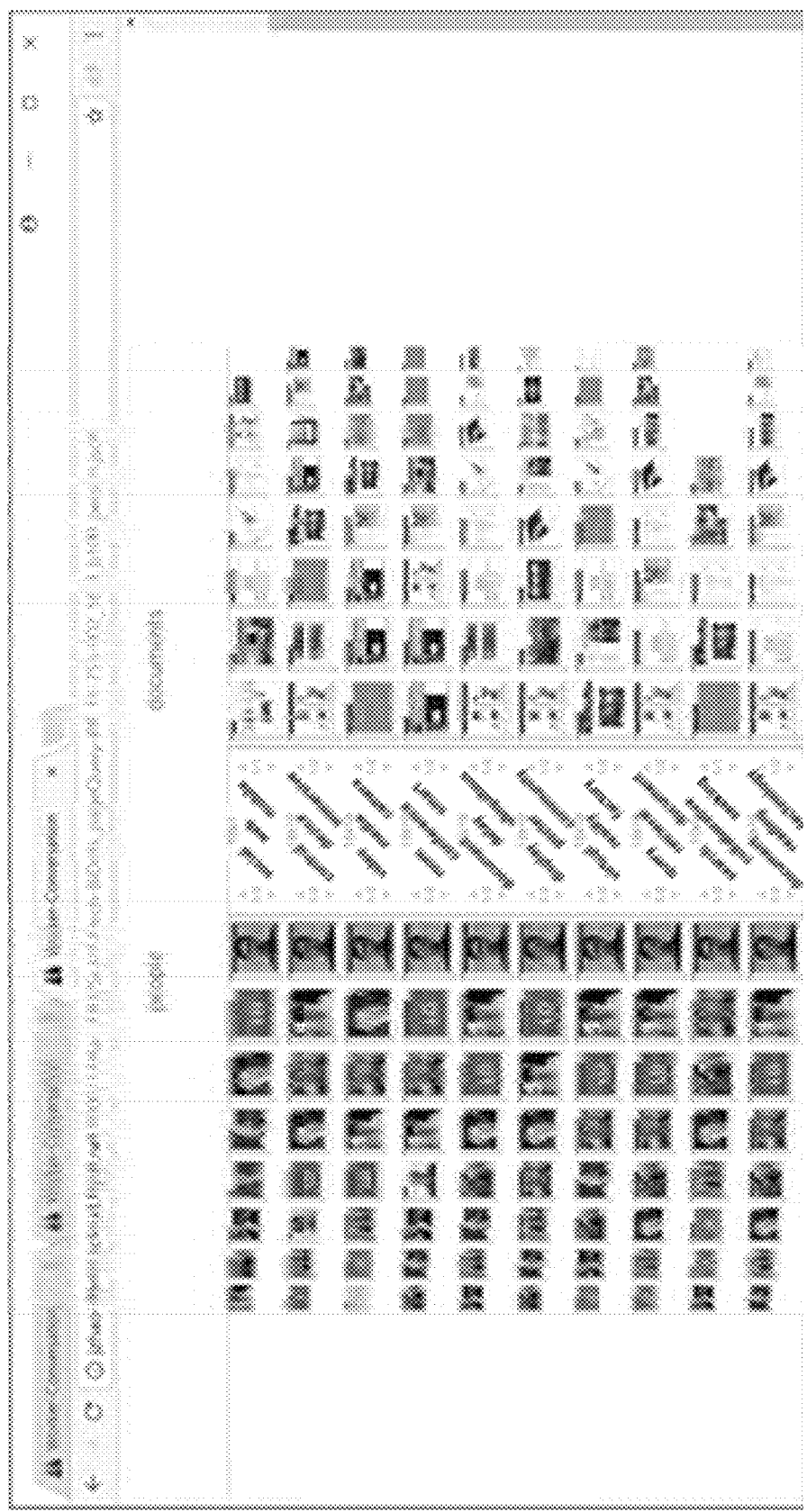
Figure 2C:
Figure 2D:

FIGS. 2(a) to 2(d) illustrate an interactive visualization of the search results, in accordance with an example implementation. In the example implementation of FIG. 2(a), the recognized persons are "pinned" near the center column. Each item in the center column represents a topic (e.g., with three topic terms), and each row contains the relevant persons and documents for that topic (e.g., with the higher ranked items larger and closer to the center column). However, other implementations for visualization of the search results may also be implemented, and the present disclosure is not limited thereto. For example, the interactive visualization can provide a view based on boosting the rank scores of the recognized persons and their documents as described herein. Views may also be provided based on filtering out recognized persons and their documents, or provided based on all relevant documents and persons, depending on the desired implementation and the context of the meeting or interaction. As described herein, FIG. 2(b) illustrates an example interactive view based on boosting the rank scores of the recognized persons and their documents. FIG. 2(c) illustrates an example interactive view based on filtering out recognized persons and their documents. FIG. 2(d) illustrates an example interactive view based on all relevant documents and persons. Other interactive views may also be constructed according to the desired implementation.

Figure 3:
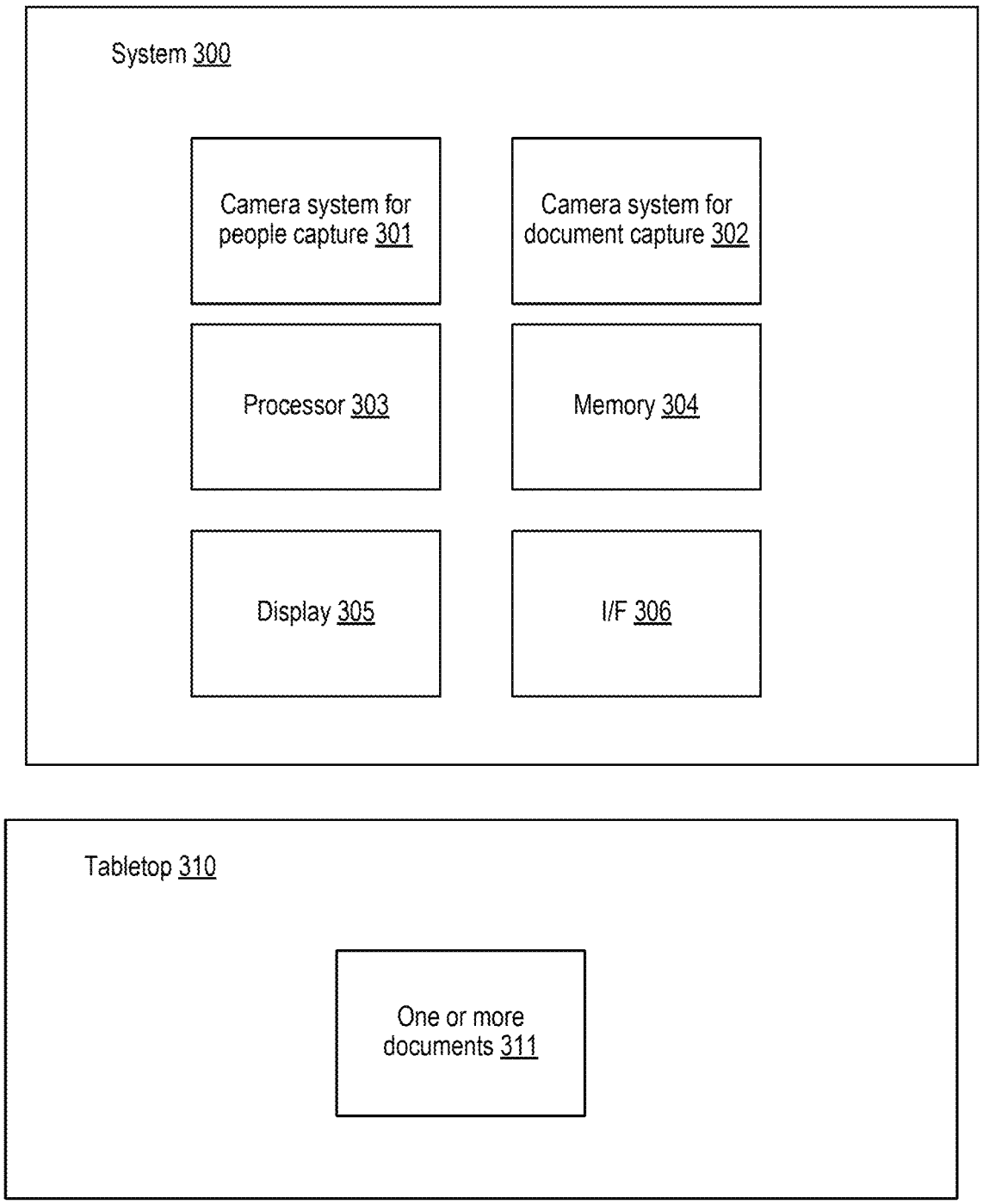
FIG. 3 illustrates an example hardware diagram of the system, in accordance with an example implementation.

FIG. 3 illustrates an example hardware diagram of the system, in accordance with an example implementation. System 300 can include a camera system for people capture 301, a separate camera system for document capture 302, a processor 303, memory 304, a display 305, and an interface (I/F) 306. The system 300 is configured to monitor a tabletop 310 that may have one or more documents 311 placed on the tabletop. Tabletop 310 can be in the form of a smart desk, a conference table, or other physical surfaces upon which one or more documents 311 may be placed. The one or more documents 311 may be in the form of paper documents, or can be in other forms in accordance with the desired implementation, such as tablets, e-readers, and so on.

The camera system for people capture 301 can be in the form of a 180 degree fisheye lens camera configured for people detection. As many conference rooms, smart desks and other office settings can typically have a 180° fisheye lens camera for video conferencing or other purposes, example implementations may thereby be seamlessly implemented in such environments that contain a 180° fisheye lens camera. Another option is to use a 360° panoramic camera placed at the center of the table. In an example implementation, processor 303 may utilize the camera system for people capture 301 to capture images of one or more people in proximity to a tabletop 310 (e.g., applied to people sitting near the tabletop 310, applied to people within a certain distance of the tabletop 310, applied to the standing speaker only, etc.). The proximity can be a preset threshold as defined according to the desired implementation.

The camera system for document capture 302 can be in the form of a high-resolution video camera that can be configured to detect text from the one or more documents 311, and operates to capture at a higher pixel density than the camera system for people capture 301. In example implementations, the high-resolution video camera can also be configured to conduct people recognition on pictures of people within the document if the one or more documents 311 contain such information. Depending on the desired implementation, one camera system may be utilized for both document capture and facial capture if the meeting facility or office setting facilitates such an implementation. Processor 303 can utilize the camera system for document capture 302 to capture images of one or more documents in proximity to the tabletop (e.g., within the borders of the tabletop 310, etc.) The proximity can be based on a threshold that is set according to the desired implementation Display 305 can be in the form of a touchscreen for visualization and interaction with search results, depending on the desired implementation. Display 305 can also include a set of displays with a central controller that show full size versions of individual documents as illustrated from FIGS. 2(a) to 2(d). I/F 306 can include interface devices such as keyboards, mouse, touchpads, or other input devices for display 305 depending on the desired implementation.

In example implementations, processor 303 can be in the form of a central processing unit (CPU) including physical hardware processors or the combination of hardware and software processors. Processor 303 is configured to take in the input for the system, which can include camera images from the camera for document capture 302, and from the camera having a 180° fisheye lens for face detection and recognition 301. Processor 303 can generate a data structure as output which includes a ranked list of two-mode networks, in which each network has two sets of vertices that are specified by a ranked lists of documents and a ranked list of persons. Such a ranked list can then be provided to display 305 in the form as illustrated in FIGS. 2(a) to 2(d). Processor 303 can also be configured to execute the flow diagrams as illustrated in FIGS. 4 and 5 for facilitating the implementations described herein for generating a query for a database derived from people recognition and text extraction from the images of the camera systems 301 and 302; determine a first ranked list of people and a second ranked list of documents based on results of the query, the results based on a calculated ranked list of two-mode networks; and provide an interface on the display 305 to access one or more documents from the second ranked list of documents.

Through I/F 306 or through the display 305 should the display be implemented as a touch screen, users access one or more documents, wherein processor 303 can be configured to conduct at least one of an execution of a presentation application for the accessed one or more documents, and a print out of the accessed one or more documents through transmission of the documents to a physical printer, depending on the desired implementation.

In additional example implementations, through I/F 306 or through the display 305 should the display be implemented as a touch screen, users can also access information about one or more people from the displayed ranked list of people, wherein processor 303 is configured to conduct at least one of an accessing of contact information of the one or more people from the ranked list (e.g., e-mail address, office number, address, mobile number, chat application handle, etc.), and an execution of a communication application to contact the accessed one or more people according to the contact information. For example, an e-mail application can be launched upon accessing the contact information of one or more people from the ranked list, or a texting/chat application can be launched in response to selection of a mobile number or chat application handle. Further, a telephone call can be placed over Voice over Internet Protocol (VoIP) or through voice applications or other methods in response to the selection of an office number or mobile number. Other implementations are also possible for launching the appropriate application or contacting the selected person in accordance with the desired implementation, and the present disclosure is not limited by any particular implementation.

Figure 4:
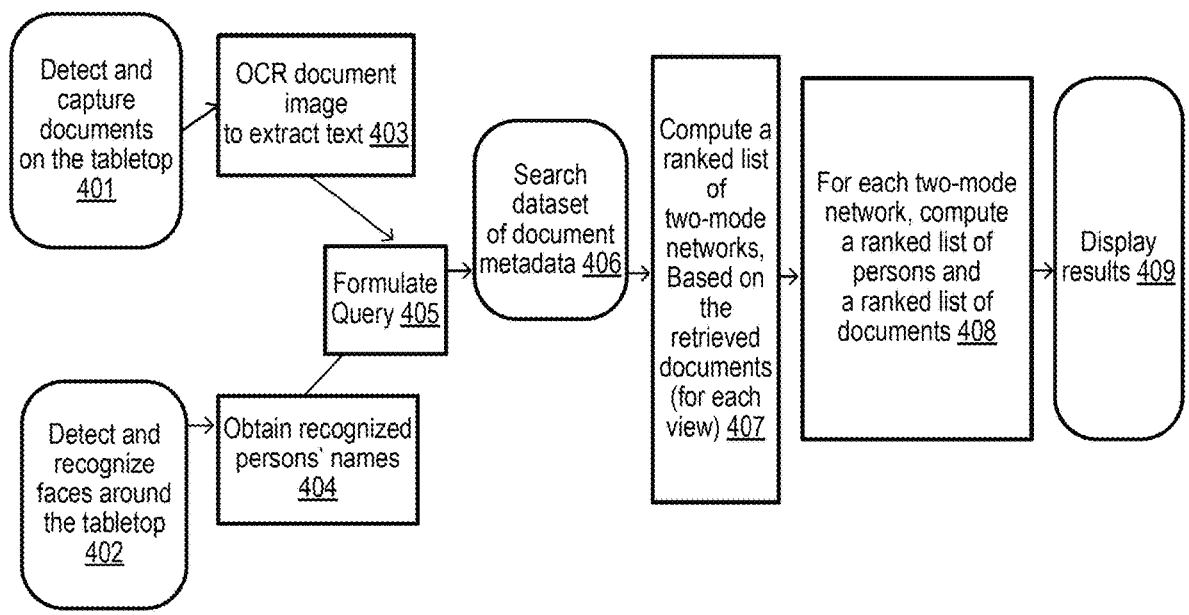
FIG. 4 illustrates an example processing pipeline for computing the output from the input, in accordance with an example implementation.
Figure 5:
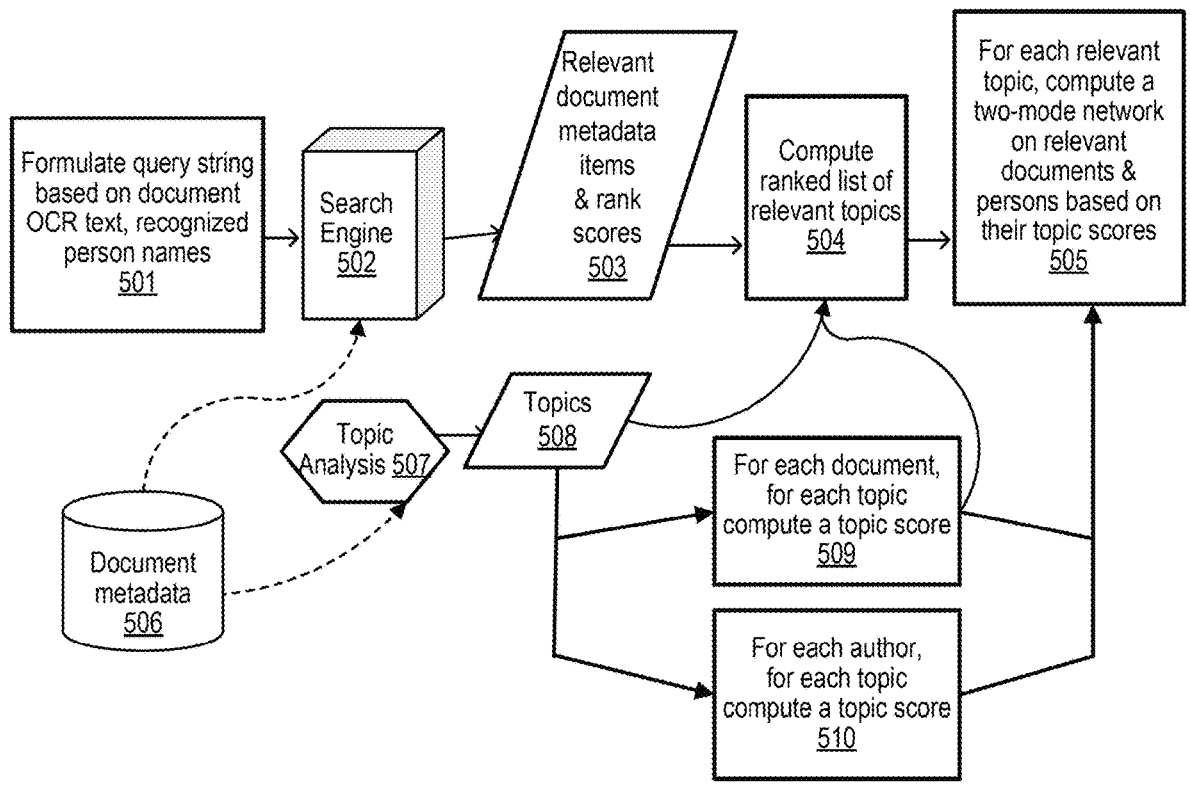
FIG. 5 illustrates an example processing pipeline for computing the two-mode networks based on topic analysis, in accordance with an example implementation.

FIG. 4 illustrates an example processing pipeline for computing the output from the input, in accordance with an example implementation. Specifically, FIG. 4 illustrates an example implementation of the overall system illustrated in FIG. 1. The system detects and captures documents on the tabletop 401 as well as detects and recognizes faces around the tabletop 402. In an example implementation, a search for documents and persons can be conducted from a dataset of document metadata (e.g., involving fields such as "title", "abstract", "authors", etc.) 406 through using a standard text-based search engine as known in the art based on a formulated query string 405. The document capture implementations as described herein provide OCR text of the page contents 403. The face detection and recognition implementations as described herein provide the names of the recognized persons around the table 404.

In an example implementation to formulate the query 405, a bag of words with the page contents (with stop words removed) and the names can be utilized. However, in some implementations there can be an issue should the number of words on the page be much larger than the number of words from the names. To address such potential problems, two separate queries with the page text and with the names can be performed and the results combined in an example implementation. Another example implementation can specify the query by targeting the "authors" field with the words from the names. Other methods can also be utilized to formulate the query 405 in accordance with the desired implementation.

From the output of the search engine, the results are described by a ranked list of document metadata items with their relevance scores 407. To compute the two-mode networks, it is possible to use different models (e.g. biclustering, co-clustering, topic modeling, etc.). An example implementation involving topic modeling and the corresponding computation is described below.

From the computed two-mode networks, a visualization is produced to display results 409 so that each two-mode network is represented by a row of thumbnails, with the persons on the left and the documents on the right. The document thumbnails can be determined utilizing any picture detection method or visual document summarization method in accordance with the desired implementation. Additionally, the output provides a description or label for each two-mode network, which depends on how the networks are modeled.

Document Capture and OCR

To capture the document for a query, for a physical paper document, the system 300 captures and reconstructs a high-resolution document image through a high-resolution camera system 302. The document does not necessarily have to be in paper form; for example, a tablet or e-reader displaying a digital document can also be utilized in accordance with the desired implementation. OCR implementations can be conducted through any desired implementation, such as the Tesseract Open Source OCR Engine.

People Detection and Recognition

In example implementations, as office settings and conference rooms typically involve a 180° fisheye lens camera, there is a problem to detect and recognize people due to the poses of the people around the table and the distortion from the 180° fisheye lens. Employing related art people recognition techniques yield insufficient results for such implementations, especially for techniques such as facial recognition when both eyes of the face are not visible. To overcome the above problem, example implementations utilize a deep learning based method that can handle head poses with one eye and the fisheye distortion to conduct facial recognition.

In addition to superior accuracy, deep learning implementations for facial recognition can involve a pre-computation of a "face embedding" representation, which when applied to new faces can require fewer faces images for each person for learning and recognition. Such implementations make the data collection much more feasible for a company or organization.

In example implementations, the face recognition utilize the pre-trained facial recognition model with the "face embedding" representation, which provides a mapping from face images to a Euclidean space where faces of the same person have small distances and faces of distinct people have large distances. Once face images of persons are collected, the face images can be embedded into the Euclidean space using the pre-trained facial recognition implementation and store the images with the corresponding names or identifiers of people in memory 304. Whenever the system detects a face in the captured image, the embedding computed by the pre-trained facial recognition is compared to the stored embeddings. Then the system 300 recognizes the face as the person corresponding to the closest one among the stored embeddings.

In addition, due to the nature of the environment (e.g., an environment involving people in proximity to a tabletop 310), other techniques for people recognition can be utilized that would not be available in related art implementations. Such implementations involve sensing a badge worn by a person in proximity to the tabletop 310 and deriving facial recognition for the person based on the detected badge, or checking the user name for a remote participant connected to the meeting by teleconference. Other implementations for conducting recognition for people in proximity to the tabletop 310 can be conducted as well, and the present disclosure is not limited to any particular implementation.

Computing Two-Mode Networks Based on Topic Analysis

FIG. 5 illustrates an example processing pipeline for computing the two-mode networks based on topic analysis, in accordance with an example implementation.

The query formulation for searching the document metadata is described above. Inputting the query into a search engine 502 provides a ranked list of relevant document metadata items and their search rank scores 503. A threshold (e.g. 100) determines the number of returned top ranked documents.

Separately, topic analysis 507 is performed on the document metadata 506 to obtain a list of topics 508. Each topic is represented by a set of terms and their associated probabilities. For each document, for each topic a topic similarity score is calculated at 509 based on matching the topic terms against the document metadata text: $\text{sim}(\text{doc},\text{topic})=\Sigma_{word}p(word|doc)p(word|topic)$. For each author, a topic similarity score is also calculated at 510 by taking the average of sim(doc, topic) over the set of documents by that author. This topic analysis step can be pre-computed (or periodically computed as the dataset is updated).

To compute the ranked list of relevant topics, a topic rank score can be calculated as follows: for each topic $t_i$, iterate over the relevant documents $\{d_j\}$ and sum up the topic similarity score $s_{ji}$ with respect to $d_j$ multiplied by the search rank score of $d_j$. Then the topics are sorted by these topic rank scores.

For each relevant topic, the most relevant documents and persons are found with respect to that topic. These items form a two-mode network. In the example of FIG. 2(a), the items are displayed as a row, along with the top terms of the topic in the center column. To compute the most relevant documents for a topic $t_i$, the $j^{th}$ document's topic score $s_{ji}$ is utilized. If a document has multiple authors that match the recognized persons (from face detection), the score $s_{ji}$ can be boosted (e.g. by multiplying by the match count).

Similarly, to compute the most relevant persons for a topic $t_i$, the $j^{th}$ author's topic score $s_{ji}$ is utilized. If an author has a match to the recognized persons (from face detection), the score $s_{ji}$ can be boosted (e.g. by multiplying by a weight, such as 10.0).

Different Views and Personalization

Different views can be generated based on principles of personalization. Example implementations to perform search personalization include query augmentation and result processing. The system performs query augmentation by using the recognized person (from face detection) names to formulate the queries. Using different variations of result processing, different views can be generated as described in FIGS. 2(a) to 2(c). Multiple views can be supported by organizing them as tabs in the user interface. By boosting the relevance scores of the recognized persons and their documents in the search results, the visualization can focus on these persons. An example of using this view is during a meeting, a user can easily access and discuss some related project or colleague to contact. This can be preferable to common situations in which a meeting participant says that they will send the documents and contact information after the meeting, when the context of the discussion has been lost (or sometimes the information failed to be shared later).

By filtering out the recognized persons and their documents in the search results, the visualization can focus on other persons and documents. An example of using this view is a single user sitting at her desk. The user knows their own documents, and does not need to see them take up valuable screen real estate.

Without any personalization result processing (but still with query augmentation), example implementations can produce a view based on all relevant documents and persons. Such implementations provide a set of relevant items that users would expect with from standard search applications, and hence can be a useful option.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

The invention claimed is:

1. A system, comprising:
a processor, configured to:
generate a query derived from people recognition conducted on the first images captured by a first camera system and text extraction on second images captured by a second camera system;
determine a first ranked list of people and a second ranked list of documents based on query results derived from a calculated ranked list of two-mode networks, wherein the processor is configured to determine the first ranked list of people and the second ranked list of documents based on results of the query through, for each of the two-mode networks on the ranked list, calculating the first ranked list of people and the second ranked list of documents; and
provide an interface to access information about one or more people from the first ranked list of people and one or more documents from the second ranked list of documents;
wherein the results are derived from a search of document metadata in a database based on names derived from the people recognition and the text extraction from OCR (optical character recognition) to retrieve one or more database documents, and the calculation of the ranked list of two-mode networks on the retrieved one or more database documents.

2. The system of claim 1, wherein the first camera system comprises a fisheye lens camera and the second camera system comprises a camera configured to capture at a higher pixel density than the fisheye lens camera.

3. The system of claim 1, wherein the processor is configured to conduct the calculation of the ranked list of two-mode networks through:
calculating a ranked list of relevant topics based on topic analysis executed on document metadata to produce for each topic in the ranked list of relevant topics, a first topic score for each of the retrieved one or more database documents and a second topic score for each author associated with the one or more database documents;
for the each topic in the ranked list of relevant topics, calculating the each of the two-mode networks based on the first topic score and the second topic score.

4. The system of claim 1, wherein the interface to access one or more documents from the second ranked list of documents is configured to conduct at least one of an execution of a presentation application for the accessed one or more documents, and a print out of the accessed one or more documents.

5. The system of claim 1, wherein the interface to access information about one or more people from the first ranked list of people is configured to conduct at least one of an accessing of contact information of the one or more people from the first ranked list, and an execution of a communication application to contact the accessed one or more people according to the contact information.

6. A method, comprising:
generating a query derived from people recognition conducted on the first images captured by a first camera system and text extraction on second images captured by a second camera system;
determining a first ranked list of people and a second ranked list of documents based on query results derived from a calculated ranked list of two-mode networks; and
providing an interface to access information about one or more people from the first ranked list of people and one or more documents from the second ranked list of documents;
wherein the results are derived from a search of document metadata in a database based on names derived from the people recognition and the text extraction from OCR Optical character recognition) to retrieve one or more database documents, and the calculation of the ranked list of two-mode networks on the retrieved one or more database documents;
wherein the determining the first ranked list of people and the second ranked list of documents based on results of the query further comprises, for each of the two-mode networks on the ranked list, calculating the first ranked list of people and the second ranked list of documents.

7. The method of claim 6, wherein the first camera system comprises a fisheye lens camera and the second camera system comprises a camera configured to capture at a higher pixel density than the fisheye lens camera.

8. The method of claim 6, wherein the conducting the calculation of the ranked list of two-mode networks comprises:
calculating a ranked list of relevant topics based on topic analysis executed on document metadata to produce for each topic in the ranked list of relevant topics, a first topic score for each of the retrieved one or more database documents and a second topic score for each author associated with the one or more database documents;
for the each topic in the ranked list of relevant topics, calculating the each of the two-mode networks based on the first topic score and the second topic score.

9. The method of claim 6, wherein the interface to access one or more documents from the second ranked list of documents is configured to conduct at least one of an execution of a presentation application for the accessed one or more documents, and a print out of the accessed one or more documents.

10. The method of claim 6, wherein the interface to access information about one or more people from the first ranked list of people is configured to conduct at least one of an accessing of contact information of the one or more people from the first ranked list, and an execution of a communication application to contact the accessed one or more people according to the contact information.

11. A non-transitory computer readable medium, storing instructions to execute a process, the instructions comprising:
generating a query derived from people recognition conducted on the first images captured by a first camera system and text extraction on second images captured by a second camera system;
determining a first ranked list of people and a second ranked list of documents based on query results derived from a calculated ranked list of two-mode networks; and
providing an interface to access information about one or more people from the first ranked list of people and one or more documents from the second ranked list of documents;
wherein the results are derived from a search of document metadata in a database based on names derived from the people recognition and the text extraction from OCR (optical character recognition) to retrieve one or more database documents, and the calculation of the ranked list of two-mode networks on the retrieved one or more database documents;
wherein the determining the first ranked list of people and the second ranked list of documents based on results of the query further comprises, for each of the two-mode networks on the ranked list, calculating the first ranked list of people and the second ranked list of documents.

12. The non-transitory computer readable medium of claim 11, wherein the first camera system comprises a fisheye lens camera and the second camera system comprises a camera configured to capture at a higher pixel density than the fisheye lens camera.

13. The non-transitory computer readable medium of claim 11, wherein the conducting the calculation of the ranked list of two-mode networks comprises:
calculating a ranked list of relevant topics based on topic analysis executed on document metadata to produce for each topic in the ranked list of relevant topics, a first topic score for each of the retrieved one or more database documents and a second topic score for each author associated with the one or more database documents;
for the each topic in the ranked list of relevant topics, calculating the each of the two-mode networks based on the first topic score and the second topic score.

14. The non-transitory computer readable medium of claim 11, wherein the interface to access one or more documents from the second ranked list of documents is configured to conduct at least one of an execution of a presentation application for the accessed one or more documents, and a print out of the accessed one or more documents.

* * * * *